(12) United States Patent
Sun et al.

(10) Patent No.: US 10,942,567 B2
(45) Date of Patent: Mar. 9, 2021

(54) GAZE POINT COMPENSATION METHOD AND APPARATUS IN DISPLAY DEVICE, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Jiankang Sun, Beijing (CN); Lili Chen, Beijing (CN); Hao Zhang, Beijing (CN); Hongzhen Xue, Beijing (CN); Fuqiang Ma, Beijing (CN); Zehua Dong, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/662,554

(22) Filed: Oct. 24, 2019

(65) Prior Publication Data
US 2020/0218343 A1 Jul. 9, 2020

(30) Foreign Application Priority Data
Jan. 3, 2019 (CN) .......................... 201910005534.6

(51) Int. Cl.
*G09G 5/00* (2006.01)
*G06F 3/01* (2006.01)
*G02B 27/00* (2006.01)
*G06T 7/73* (2017.01)
*G02B 27/01* (2006.01)

(52) U.S. Cl.
CPC ......... *G06F 3/013* (2013.01); *G02B 27/0093* (2013.01); *G06T 7/73* (2017.01); *G02B 2027/0187* (2013.01)

(58) Field of Classification Search
CPC ...................................................... G06F 3/013
See application file for complete search history.

(56) References Cited

U.S. PATENT DOCUMENTS

2010/0110374 A1* 5/2010 Raguin ................ G06K 9/0061
351/206

* cited by examiner

*Primary Examiner* — Nan-Ying Yang
(74) *Attorney, Agent, or Firm* — Arent Fox LLP; Michael Fainberg

(57) ABSTRACT

A gaze point compensation method and apparatus in a display device, and a display device are provided. The method includes: obtaining a real-time eye image of a user; obtaining an eye-corner position coordinate in the real-time eye image; when the eye-corner position coordinate is within an initial calibration range, making first compensation for the eye-corner position coordinate according to a correspondence relationship between a pupil and an eye-corner position; otherwise, making second compensation for the eye-corner position coordinate, wherein the second compensation is configured to make the eye-corner position coordinate after the second compensation at least be within the initial calibration range; and compensating for a gaze point according to the first compensation or the second compensation.

15 Claims, 4 Drawing Sheets

GAZE POINT COMPENSATION METHOD AND APPARATUS IN DISPLAY DEVICE, AND DISPLAY DEVICE

CROSS-REFERENCES TO RELATED APPLICATION

This application claims priority to Chinese patent application No. 201910005534.6 filed on Jan. 3, 2019, which is incorporated herein by reference in its entirety.

FIELD

The present disclosure relates to the field of smart display devices, and particularly to a gaze point compensation method and apparatus in a display device, and a display device.

BACKGROUND

With the development of the Virtual Reality (VR) technologies, the applications of the eye tracking technology to virtual reality interaction, gaze point rendering, etc., have been favored. At present, in an eye tracking system based on VR, a camera for capturing eye movements is located in a VR head-mounted display, and since the human eye and the VR head-mounted display are two separate objects, the human eye may slide relative from the VR head-mounted display in operation, so that the eye tracking system may deviate from an initial calibration position, thus degrading the precision of eye tracking.

SUMMARY

In an aspect, an embodiment of the disclosure provides a gaze point compensation method in a display device. The method includes: obtaining a real-time eye image of a user; obtaining an eye-corner position coordinate in the real-time eye image; making first compensation for the eye-corner position coordinate according to a correspondence relationship between a pupil and an eye-corner position when the eye-corner position coordinate is within an initial calibration range; making second compensation for the eye-corner position coordinate when the eye-corner position coordinate is outside the initial calibration range, wherein the second compensation is configured to make the eye-corner position coordinate after the second compensation at least be within the initial calibration range; and compensating for a gaze point according to the first compensation or the second compensation.

In some embodiments, the second compensation includes first sub-compensation and second sub-compensation; and making the second compensation for the eye-corner position coordinate includes: making the first sub-compensation for the eye-corner position coordinate, wherein the first sub-compensation is configured to make the eye-corner position coordinate after the first sub-compensation be within the initial calibration range; and making the second sub-compensation for the eye-corner position coordinate after the first sub-compensation, wherein the second sub-compensation is to compensate for the eye-corner position coordinate according to the correspondence relationship between the pupil and the eye-corner position.

In some embodiments, making the first compensation on the eye-corner position coordinate includes: obtaining an eye-corner point coordinate corresponding to a pupil center coordinate in the real-time eye image according to the correspondence relationship between the pupil and the eye-corner position, and determining a difference between the eye-corner point coordinate and the eye-corner position coordinate as an eye-corner point compensation amount; and compensating for the gaze point according to the first compensation includes: compensating for the gaze point according to the eye-corner point compensation amount.

In some embodiments, making the first sub-compensation for the eye-corner position coordinate includes: determining a minimum compensation amount for making the eye-corner position coordinate be within the initial calibration range as a coarse compensation amount, and determining a sum of the coarse compensation amount and the eye-corner position coordinate as the eye-corner position coordinate after the first sub-compensation; making the second sub-compensation for the eye-corner position coordinate after the first sub-compensation includes: determining a sum of pupil center coordinate in the real-time eye image and the coarse compensation amount as pupil center coordinate after compensation, obtaining eye-corner point coordinate corresponding to the pupil center coordinate after compensation according to the correspondence relationship between the pupil and the eye-corner position, and determining a difference between the eye-corner point coordinate and the eye-corner position coordinate after the first sub-compensation as a precise compensation amount; and compensating for the gaze point according to the second compensation includes: determining a sum of the coarse compensation amount and the precise compensation amount as an eye-corner point compensation amount, and compensating for the gaze point according to the eye-corner point compensation amount.

In some embodiments, the method further includes: creating the correspondence relationship between the pupil and the eye-corner position.

In some embodiments, creating the correspondence relationship between the pupil and the eye-corner position includes: obtaining a plurality of calibration eye images when the user is gazing at a plurality of calibration points respectively; obtaining pupil center coordinates and eye-corner position coordinates in the calibration eye images; and creating a relationship equation between the pupil and the eye-corner position according to the pupil center coordinates and the eye-corner position coordinates in the calibration eye images.

In some embodiments, the relationship equation between the pupil and the eye-corner position is as follows:

$$x_{corner}=a_0+a_1 \cdot x+a_2 \cdot x^2+a_3 \cdot x^3$$

$$y_{corner}=b_0+b_1 \cdot y+b_2 \cdot y^2+b_3 \cdot y^3$$

wherein the pupil center coordinate is (x, y), the eye-corner position coordinate is ($x_{corner}$, $y_{corner}$), and $a_0$, $a_1$, $a_2$, and $a_3$ and $b_0$, $b_1$, $b_2$, and $b_3$ are coefficients of a fitting curve for the pupil and the eye-corner position.

In some embodiments, obtaining the eye-corner position coordinate in the real-time eye image includes: obtaining a pupil center coordinate in the real-time eye image; performing edge detection on the real-time eye image to determine a coordinate of an edge point in an eye-corner area farthest from the pupil center coordinate as a coarse coordinate of the eye-corner point in the real-time eye image; and performing corner detection on the real-time eye image to obtain a plurality of corner point coordinates, and determining the corner point coordinate closest to the coarse coordinate of the eye-corner points among the plurality of corner point coordinates as the eye-corner position coordinate in the real-time eye image.

In some embodiments, obtaining the pupil center coordinate in the real-time eye image includes: binarizing the real-time eye image, extracting a largest connected area satisfying a pupil characteristic in the binarized real-time eye image, and extracting edge points of the largest connected area; and obtaining the pupil center coordinate through pupil elliptical fitting of the edge points.

In some embodiments, compensating for the gaze point according to the eye-corner point compensation amount includes: obtaining a gaze point coordinate corresponding to the eye-corner point coordinate, and a gaze point compensation amount corresponding to the eye-corner point compensation amount according to a relationship equation between an eye-corner position and a gaze point position; and determining a sum of the gaze point coordinate and the gaze point compensation amount as the gaze point coordinate after compensation.

In some embodiments, creating the correspondence relationship between the eye-corner position and the gaze point position includes: obtaining a plurality of calibration eye images when the user is gazing at a plurality of calibration points respectively; obtaining eye-corner position coordinates in the calibration eye images, and obtaining gaze point position coordinates corresponding to the plurality of calibration eye images; and creating a relationship equation between the eye-corner position and the gaze point position according to the eye-corner position coordinates in the calibration eye images and the gaze point position coordinates.

In some embodiments, the relationship equation between the eye-corner position and the gaze point position is as follows:

$$G_x = c_0 + c_1 x_{corner} + c_2 y_{corner} + c_3 x_{corner} y_{corner}$$

$$G_y = d_0 + d_1 x_{corner} + d_2 y_{corner} + d_3 x_{corner} y_{corner}$$

wherein the gaze point position coordinate is $(G_x, G_y)$, the eye-corner position coordinate is $(x_{corner}, y_{corner})$, and $c_0, c_1, c_2$, and $c_3$, and $d_0, d_1, d_2$, and $d_3$ are coefficients of a fitting curve for the eye-corner position and the gaze point position.

In another aspect, an embodiment of the disclosure provides a gaze point compensation apparatus in a display device. The apparatus includes: an eye image obtaining sensor configured to obtain a real-time eye image of a user; a processor configured to obtain an eye-corner position coordinate in the real-time eye image; when the eye-corner position coordinate is within an initial calibration range, to make first compensation for the eye-corner position coordinate according to a correspondence relationship between a pupil and an eye-corner position; when the eye-corner position coordinate is outside the initial calibration range, to make second compensation for the eye-corner position coordinate, wherein the second compensation is configured to make the eye-corner position coordinate after the second compensation at least be within the initial calibration range; and to compensate for a gaze point according to the first compensation or the second compensation; and a data memory configured to store the real-time eye image, the eye-corner position coordinate in the real-time eye image, and the correspondence relationship between the pupil and the eye-corner position.

In some embodiments, the second compensation includes first sub-compensation and second sub-compensation; and the processor is configured: to make the first sub-compensation for the eye-corner position coordinate, wherein the first sub-compensation is configured to make the eye-corner position coordinate after the first sub-compensation be within the initial calibration range; and to make the second sub-compensation for the eye-corner position coordinate after the first sub-compensation, wherein the second sub-compensation is to compensate for the eye-corner position coordinate according to the correspondence relationship between the pupil and the eye-corner position.

In still another aspect, an embodiment of the disclosure provides a display device. The display device includes: a memory configured to store computer program; and a processor configured to execute the computer program to perform the gaze point compensation method according to any one of the solutions above.

BRIEF DESCRIPTION OF THE DRAWINGS

In order to make the technical solutions according to the embodiments of the disclosure or in the prior art more apparent, the drawings to which reference is to be made in the description of the embodiments or the prior art will be introduced below in brevity, and apparently the embodiments to be described below are only some embodiments of the disclosure. Those ordinarily skilled in the art can further derive the other drawings from these drawings without any inventive effort.

DETAILED DESCRIPTION

The technical solutions according to the embodiments of the disclosure will be described below clearly and fully with reference to the drawings in the embodiments of the disclosure, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure.

Embodiments of the disclosure provide a gaze point compensation method and apparatus in a display device, and a display device, so as to address the problem in the related art that the eye may slide relative from the VR head-mounted display, thus degrading the precision of eye tracking.

Figure 1:
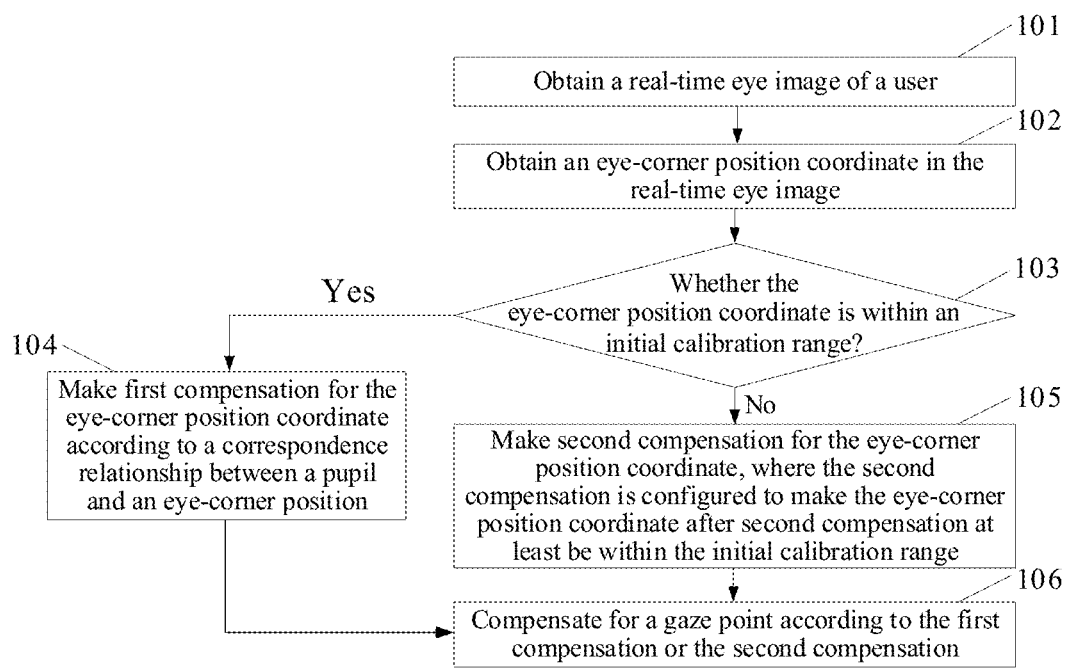
FIG. 1 is a first flow chart of a gaze point compensation method in a display device according to an embodiment of the disclosure.

The embodiment of the disclosure provides a gaze point compensation method in a display device, as illustrated in FIG. 1, the method includes the following steps.

The step 101 is to obtain a real-time eye image of a user.

Here the real-time eye image is a taken eye image of the user when using the display device. The display device can be a Virtual Reality (VR) device, an Augmented Reality (AR) device, a Mixed Reality (MR) device, etc., although the embodiment of the disclosure will not be limited thereto.

Since a VR head-mounted display operates in a closed and dark environment, in order to separate a pupil from an iris area in a human eye, light is generally supplemented using a near-infrared LED, that is, the real-time eye image is an eye image taken while being illuminated with the near-infrared LED. In a real application, the wavelength of the near-infrared LED can be 850 nm.

The step 102 is to obtain an eye-corner position coordinate of the real-time eye image.

Here the eye-corner position coordinate can be obtained in a number of ways, and for example, in one or a combination of edge detection, graph fitting, corner detection, a centroid scheme, etc., although the embodiment of the disclosure will not be limited thereto.

The step 103 is to determine whether the eye-corner position coordinate is within an initial calibration range, and if so, to proceed to the step 104; otherwise, to proceed to the step 105.

Here the initial calibration range can be preset, or can be determined according to eye-corner position coordinates in calibration eye images, although the embodiment of the disclosure will not be limited thereto.

The step 104 is to make first compensation for the eye-corner position coordinate according to a correspondence relationship between a pupil and an eye-corner position.

Here the correspondence relationship between the pupil and the eye-corner position can be preset, or can be obtained through curve fitting of pupil center coordinates and eye-corner position coordinates in a plurality of calibration eye images, although the embodiment of the disclosure will not be limited thereto.

The step 105 is to make second compensation for the eye-corner position coordinate, where the second compensation is configured to make the eye-corner position coordinate after compensation at least be within the initial calibration range.

The step 106 is to compensate for a gaze point according to the first compensation or the second compensation.

Since there is a correspondence relationship between the eye-corner position and gaze point position, the gaze point corresponding to the real-time eye image can be compensated for using a compensation amount for compensating for the eye-corner position coordinate. Since an eye-corner moves with a moving eye, the gaze point corresponding to the real-time eye image can alternatively be compensated according to a correspondence relationship between the pupil and the gaze point position.

In this way, as compared with the related art, in the embodiment of the disclosure, it is determined whether the eye-corner position coordinate in the real-time eye image is within the initial calibration range, then the first compensation or the second compensation is made for the eye-corner position coordinate according to the correspondence relationship between a pupil and an eye-corner position, and finally the gaze point corresponding to the real-time eye image is further compensated according to the first compensation or the second compensation, so that when the human eye slides relative to the display device, the sliding compensation of gaze point of the human eye can be made to thereby improve the precision of eye tracking in the display device.

In some embodiment of the disclosure, the second compensation includes first sub-compensation and second sub-compensation, and making the second compensation for the eye-corner position coordinate specifically includes: making the first sub-compensation for the eye-corner position coordinate, where the first sub-compensation is configured to make the eye-corner position coordinate after the first sub-compensation be within the initial calibration range. Specifically the minimum compensation amount for making the eye-corner position coordinate be within the initial calibration range is determined as a coarse compensation amount, and then the sum of the coarse compensation amount and the eye-corner position coordinate is determined as the eye-corner position coordinate after the first sub-compensation; and making the second sub-compensation for the eye-corner position coordinate after the first sub-compensation, where the second sub-compensation is to compensate for the eye-corner position coordinate according to the correspondence relationship between the pupil and the eye-corner position. Specifically the sum of pupil center coordinate in the real-time eye image and the coarse compensation amount is determined as the pupil center coordinate after compensation; and then eye-corner point coordinate corresponding to the pupil center coordinate after compensation are obtained according to the correspondence relationship between the pupil and the eye-corner position, and the difference between the eye-corner point coordinate and the eye-corner position coordinate after the first sub-compensation is determined as a precise compensation amount.

Compensating for the gaze point according to the second compensation specifically includes: determining the sum of the coarse compensation amount and the precise compensation amount as an eye-corner point compensation amount, and compensating for the gaze point according to the eye-corner point compensation amount.

In some other embodiment of the disclosure, making the first compensation on the eye-corner position coordinate specifically includes: firstly obtaining the eye-corner point coordinate corresponding to the pupil center coordinate in the real-time eye image according to the correspondence relationship between the pupil and eye-corner position, and then determining the difference between the eye-corner point coordinate and the eye-corner position coordinate as the eye-corner point compensation amount.

Compensating for the gaze point according to the first compensation specifically includes: compensating for the gaze point according to the eye-corner point compensation amount.

Furthermore compensating for the gaze point according to the eye-corner point compensation amount specifically includes: obtaining an gaze point position coordinate corresponding to the eye-corner point coordinate, and a gaze point compensation amount corresponding to the eye-corner point compensation amount according to the correspondence relationship between an eye-corner position and a gaze point position, and then determining the sum of the gaze point position coordinate and the gaze point compensation amount as gaze point position coordinates after the compensation.

Here the correspondence relationship between an eye-corner position and a gaze point position can be preset, or can be obtained through curve fitting of eye-corner position coordinates and their gaze point position coordinates in a plurality of calibration eye images, although the embodiment of the disclosure will not be limited thereto. It shall be noted that curve fitting in the embodiment of the disclosure will not be limited to any specific equation.

Figure 2:
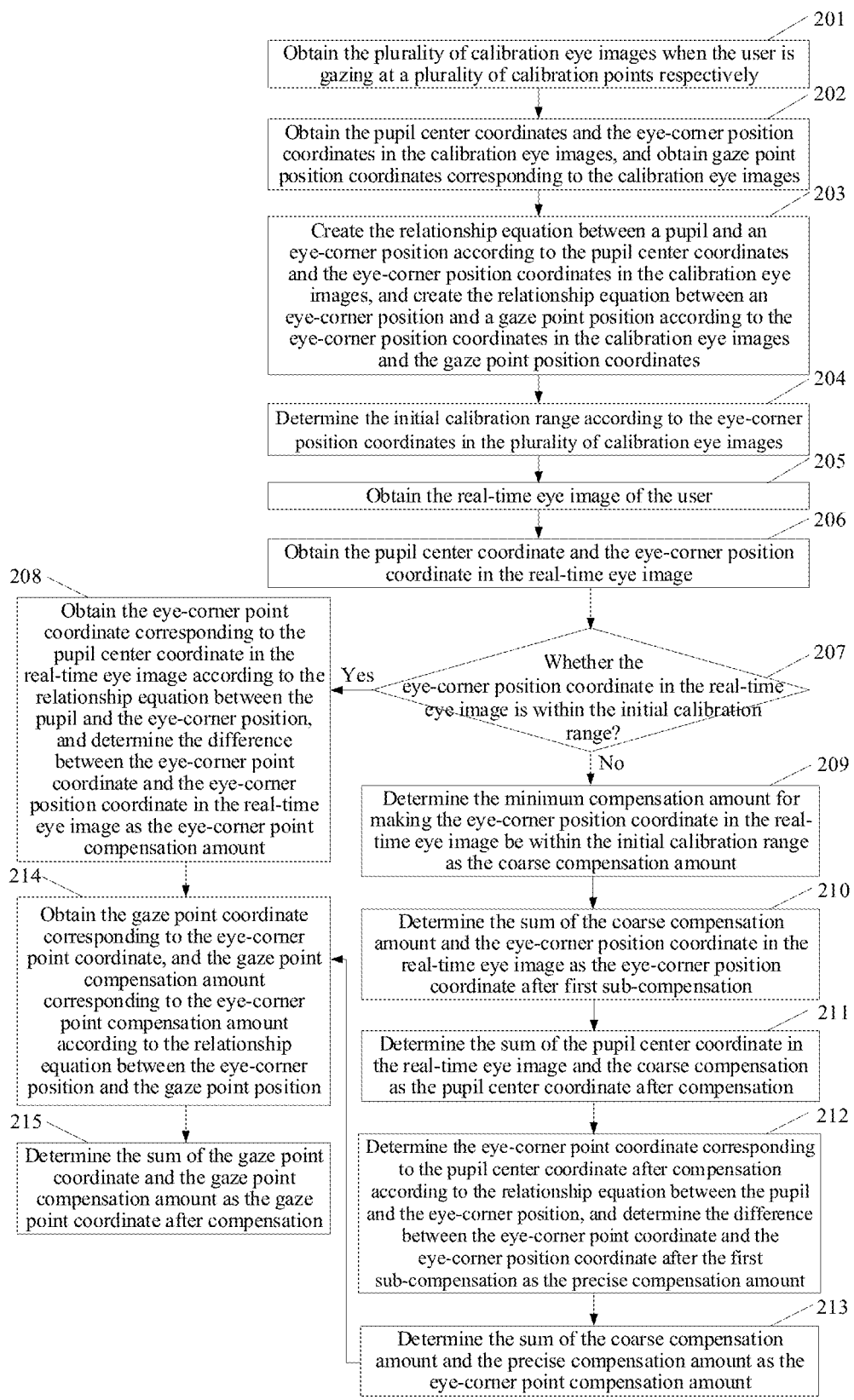
FIG. 2 is a second flow chart of the gaze point compensation method in a display device according to the embodiment of the disclosure.

Anther embodiment of the disclosure provides a gaze point compensation method in a display device, and as illustrated in FIG. 2, the method includes the following steps.

The step 201 is to obtain the plurality of calibration eye images when the user is gazing at a plurality of calibration points respectively.

Here the plurality of calibration eye images are eye images taken when human eyes are gazing a plurality of initial calibration points on a screen of the display device. In a real application, five or nine point calibration method is generally used, i.e., there are five or nine initial calibration points, and thus there are five or nine calibration eye images. It shall be noted that the plurality of calibration eye images are also eye images taken while being illuminated with a near-infrared LED.

The step 202 is to obtain the pupil center coordinates and the eye-corner position coordinates in the calibration eye images, and to obtain the gaze point position coordinates corresponding to the plurality of calibration eye images.

Here the gaze point position coordinates corresponding to the plurality of calibration eye images are coordinates of the plurality of initial calibration points in the step 201.

The step 203 is to create the relationship equation between a pupil and an eye-corner position according to the pupil center coordinates and the eye-corner position coordinates in the calibration eye images, and to create the relationship equation between an eye-corner position and a gaze point position according to the eye-corner position coordinates and the gaze point position coordinates in the calibration eye images.

In a real application, the relationship equation between a pupil and an eye-corner position can be as follows:

$$x_{corner}=a_0+a_1 \cdot x+a_2 \cdot x^2+a_3 \cdot x^3$$

$$y_{corner}=b_0+b_1 \cdot y+b_2 \cdot y^2+b_3 \cdot y^3$$

Where pupil center coordinate is (x, y), eye-corner position coordinate is $(x_{corner}, y_{corner})$, and $a_0$, $a_1$, $a_2$, and $a_3$, and $b_0$, $b_1$, $b_2$, and $b_3$ are coefficients of a fitting curve for the pupil and the eye-corner position. All coefficients can be determined from at least four groups of the pupil center coordinate (x, y) and the eye-corner position coordinate $(x_{corner}, y_{corner})$ in at least four calibration eye images.

The relationship equation between an eye-corner position and a gaze point position can be as follows:

$$G_x=c_0+c_1 \cdot x_{corner}+c_2 \cdot y_{corner}+c_3 \cdot x_{corner} \cdot y_{corner}$$

$$G_y=d_0+d_1 \cdot x_{corner}+d_2 \cdot y_{corner}+d_3 \cdot x_{corner} \cdot y_{corner}$$

Where the gaze point position coordinate is $(G_x, G_y)$, the eye-corner position coordinate is $(x_{corner}, y_{corner})$, and $c_0$, $c_1$, $c_2$, and $c_3$, and $d_0$, $d_1$, $d_2$, and $d_3$ are coefficients of a fitting curve for the eye-corner position and the gaze point position. All coefficients can be determined from at least four groups of the eye-corner position coordinate $(x_{corner}, y_{corner})$ and the gaze point position coordinate $(G_x, G_y)$ in at least four calibration eye images.

The step 204 is to determine the initial calibration range according to the eye-corner position coordinates in the plurality of calibration eye images.

After the eye-corner position coordinates in the plurality of calibration eye images are obtained, the initial calibration range of an eye-corner point can be determined according to the eye-corner position coordinates. Specifically an X-axis calibration range of an eye-corner point is defined by the maximum value $m_2$ and the minimum value $m_1$ of X-axis coordinates in the plurality of eye-corner position coordinates, and a Y-axis calibration range of an eye-corner point is defined by the maximum value $n_2$ and the minimum value $n_1$ of Y-axis coordinates in the plurality of eye-corner position coordinates, that is, the initial calibration range of an eye-corner point is $x \in [m_1, m_2]$, and $y \in [n_1, n_2]$.

It shall be noted that the step 203 and the step 204 can be performed in a reversed order, or can be performed concurrently, although the embodiment of the disclosure will not be limited thereto.

The step 205 is to obtain the real-time eye image of the user.

The step 206 is to obtain the pupil center coordinate and the eye-corner position coordinate in the real-time eye image.

The step 207 is to determine whether the eye-corner position coordinate in the real-time eye image is within the initial calibration range, and if so, to proceed to the step 208; otherwise, to proceed to the step 209.

The step 208 is to obtain the eye-corner point coordinate corresponding to the pupil center coordinate in the real-time eye image according to the relationship equation between a pupil and an eye-corner position, and to determine the difference between the eye-corner point coordinate and the eye-corner position coordinate in the real-time eye image as the eye-corner point compensation amount; further to proceed to the step 214.

When the eye-corner position coordinate $(x_{corner}, y_{corner})$ is within the initial calibration range, that is, $x_{corner} \in [m_1, m_2]$, and $y_{corner} \in [n_1, n_2]$, only precise compensation needs to be made. Specifically the pupil center coordinate (x, y) in the real-time eye image is substituted into the relationship equation between a pupil and an eye-corner position, the corresponding eye-corner point coordinate $(x_{corner}^{correct}, y_{corner}^{correct})$ is calculated and then the eye-corner point compensation amount $(x_{compensation}, y_{compensation})$ is calculated, where $x_{compensation}=x_{corner}^{correct}-x_{corner}$, and $y_{compensation}=y_{corner}^{correct}-y_{corner}$.

The step 209 is to determine the minimum compensation amount for making the eye-corner position coordinate in the real-time eye image be within the initial calibration range as the coarse compensation amount.

When the eye-corner position coordinate $(x_{corner}, y_{corner})$ isn't within the initial calibration range, that is, $x_{corner}<m_1$ or $x_{corner}>m_2$, or $y_{corner}<n_1$ or $y_{corner}>n_2$, firstly coarse compensation needs to be made, and specifically when $x_{corner}<m1$, then $x_{compensation}^{rough}=m_1-x_{corner}$; when $x_{corner}>m_2$, then $x_{compensation}^{rough}=m_2-x_{corner}$; when $y_{corner}<n_1$, then $y_{compensation}^{rough}=n_1-y_{corner}$, and when $y_{corner}>n_2$, then $y_{compensation}^{rough}=n_2-y_{corner}$, so that the coarse compensation amount is determined as $(x_{compensation}^{rough}, y_{compensation}^{rough})$.

The step 210 is to determine the sum of the coarse compensation amount and the eye-corner position coordinate in the real-time eye image as the eye-corner position coordinate after the first sub-compensation.

Here when $x_{corner}<m_1$, then the X-axis coordinate in the eye-corner position coordinate after the first sub-compensation (i.e., the coarse compensation) is $m_1$; when $x_{corner}>m_2$, then the X-axis coordinate in the eye-corner position coordinate after the first sub-compensation (i.e., the coarse compensation) is $m_2$; when $y_{corner}<n_1$, then the Y-axis coordinate in the eye-corner position coordinate after the first sub-compensation (i.e., the coarse compensation) is $n_1$; and when $y_{corner}>n_2$, then the Y-axis coordinate in the eye-corner position coordinate after the first sub-compensation (i.e., the coarse compensation) is $n_2$.

The step 211 is to determine the sum of the pupil center coordinate in the real-time eye image and the coarse compensation as the pupil center coordinate after the compensation.

Here the pupil center coordinate in the real-time eye image is (x, y), and the coarse compensation amount is ($x_{compensation}^{rough}$, $y_{compensation}^{rough}$) so the pupil center coordinate after the compensation are ($x+x_{compensation}^{rough}$, $y+y_{compensation}^{rough}$).

It shall be noted that the step 210 and the step 211 can be performed in a reversed order, or can be performed concurrently, although the embodiment of the disclosure will not be limited thereto.

The step 212 is to determine the eye-corner point coordinate corresponding to the pupil center coordinate after the compensation according to the relationship equation between a pupil and an eye-corner position, and to determine the difference between the eye-corner point coordinate and the eye-corner position coordinate after the first sub-compensation as the precise compensation amount.

After the coarse compensation amount ($x_{compensation}^{rough}$, $y_{compensation}^{rough}$) is obtained, the precise compensation can be made. Specifically the pupil center position after the compensation ($x_{compensation}^{rough}$, $y+y_{compensation}^{rough}$) is substituted into the relationship equation between a pupil and an eye-corner position, the corresponding eye-corner point coordinate ($x_{corner}^{correct}$, $y_{corner}^{correct}$) is obtained, and then the difference between the eye-corner point coordinate and the eye-corner position coordinate after the first sub-compensation is determined as the precise compensation amount ($x_{compensation}^{precise}$, $y_{compensation}^{precise}$).

The step 213 is to determine the sum of the coarse compensation amount and the precise compensation amount as the eye-corner point compensation amount; and further to proceed to the step 214.

Specifically, $x_{compensation}=x_{compensation}^{rough}+x_{compensation}^{precise}$; $y_{compensation}=y_{compensation}^{rough}+y_{compensation}^{precise}$; so the eye-corner point compensation amount is obtained as ($x_{compensation}$, $y_{compensation}$).

The step 214 is to obtain the gaze point coordinate corresponding to the eye-corner point coordinate, and the gaze point compensation amount corresponding to the eye-corner point compensation amount according to the relationship equation between an eye-corner position and a gaze point position.

The eye-corner point coordinate ($x_{corner}^{correct}$, $y_{corner}^{correct}$) obtained in the step 208 is substituted into the relationship equation between an eye-corner position and a gaze point position to obtain the corresponding gaze point coordinate ($G_x^{correct}$, $G_y^{correct}$); and the eye-corner point compensation amount ($x_{compensation}$, $y_{compensation}$) obtained in the step 208 or the step 213 is substituted into the relationship equation between an eye-corner position and a gaze point position, and the corresponding gaze point compensation amount ($G_x^{compensation}$, $G_y^{compensation}$) is obtained.

The step 215 is to determine the sum of the gaze point coordinate and the gaze point compensation amount as the gaze point position coordinate after compensation.

Specifically $G_x=G_x^{correct}+G_x^{compensation}$, and $G_y=G_y^{correct}+G_y^{compensation}$, so that the gaze point position coordinate ($G_x$, $G_y$) after the compensation is obtained. In this way, the sliding compensation of human eye gaze point can be made to thereby improve the precision of eye tracking in the display device.

In some other embodiment of the disclosure, obtaining the pupil center coordinate in the real-time eye image specifically includes: firstly binarizing the real-time eye image; then extracting the largest connected area, satisfying a pupil characteristic, in the binarized real-time eye image, and extracting edge points of the largest connected area; and finally obtaining the pupil center coordinate through pupil elliptical fitting of the edge points.

In order to process the real-time eye image, and to obtain the more precise pupil center coordinate, before the real-time eye image is binarized, the method further includes: performing grayscale conversion and denoising process on the pupil center coordinate in the real-time eye image.

Figure 3:
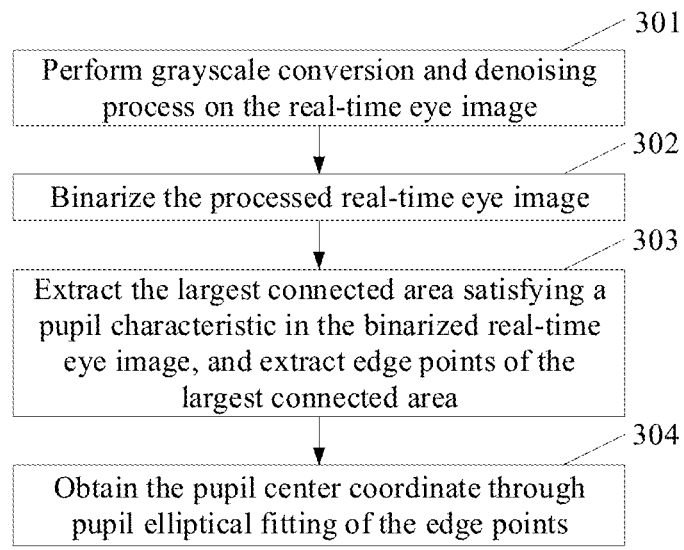
FIG. 3 is a flow chart of a method for obtaining a pupil center coordinate according to an embodiment of the disclosure.

In still another embodiment of the disclosure, as illustrated in FIG. 3, obtaining the pupil center coordinate in the real-time eye image includes the following steps.

The step 301 is to perform grayscale conversion and denoising process on the real-time eye image.

The denoising process can be Gaussian filtering process.

The step 302 is to binarize the processed real-time eye image.

The step 303 is to extract the largest connected area satisfying a pupil characteristic in the binarized real-time eye image, and to extract edge points of the largest connected area.

The largest connected area satisfying a pupil characteristic in the real-time eye image is extracted according to the characteristic of size and shape of the pupil.

The step 304 is to obtain the pupil center coordinate through pupil elliptical fitting of the edge points.

In some other embodiment of the disclosure, obtaining the eye-corner position coordinate in the real-time eye image specifically includes: firstly performing edge detection on the real-time eye image, to determine the coordinate of the edge point in the eye-corner area farthest from the pupil center coordinate as a coarse coordinate of the eye-corner point in the real-time eye image; then performing corner detection on the real-time eye image to obtain a plurality of corner point coordinates; and next determining the corner point coordinate closest to coarse coordinate of the eye-corner point among the plurality of corner point coordinates as the eye-corner position coordinate in the real-time eye image.

Furthermore in order to lower a workload for processing the image, a first area image including the eye-corner can be cut out starting with the pupil center coordinate in the real-time eye image.

Performing the edge detection on real-time eye image to obtain the coordinate of the edge point in the eye-corner area farthest from the pupil center coordinate specifically includes: performing the edge detection on the first area image to obtain the coordinate of the edge point farthest from the pupil center coordinate as the coarse coordinate of the eye-corner point in the real-time eye image.

Before the corner detection on the real-time eye image is performed, the method further includes: cutting out, in the first area image, a second area image including the eye-corner with the coarse coordinate of the eye-corner point being a center.

Performing corner detection on the real-time eye image to obtain the plurality of corner point coordinates specifically includes: performing corner detection on the second area image to obtain the plurality of corner point coordinates.

In order to process the real-time eye image, and to obtain more precise eye-corner position coordinate, the real-time eye image can be the real-time eye image after grayscale conversion and denoising process.

Figure 4:
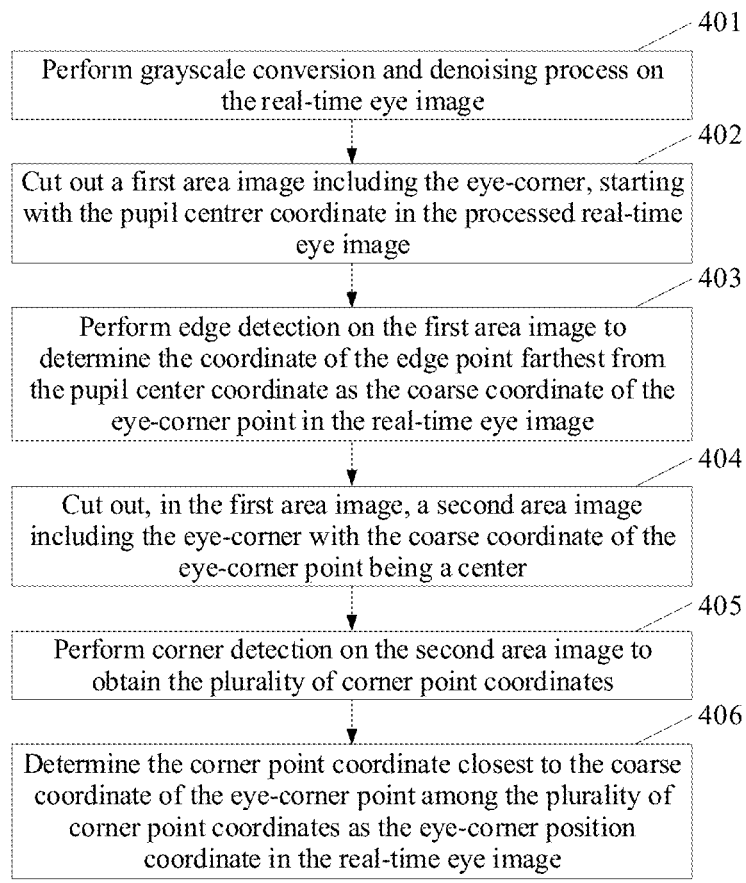
FIG. 4 is a flow chart of a method for obtaining an eye-corner position coordinate according to an embodiment of the disclosure.

In still another embodiment of the disclosure, as illustrated in FIG. 4, obtaining the eye-corner position coordinate in the real-time eye image includes the following steps.

The step 401 is to perform grayscale conversion and denoising process on the real-time eye image.

The denoising process can be Gaussian filtering process.

The step 402 is to cut out a first area image including the eye-corner, starting with the pupil center coordinate in the processed real-time eye image.

In the embodiment of the disclosure, the size of the first area image will not be limited to any specific size. By way of an example, as illustrated in two pictures on the left of FIG. 5, a rectangular image area with the size of $$\left(\frac{2}{3}W * \frac{2}{3}H\right)$$

at the bottom right corner can be cut out starting with the pupil center coordinate, where W is the width of the human eye in the current image, and H is the height of the human eye in the current image, or an area to be cut out can be determined in a real test.

The step 403 is to perform edge detection on the first area image, to obtain the coordinate of the edge point farthest from the pupil center coordinate as the coarse coordinate of the eye-corner point in the real-time eye image.

Figure 5:
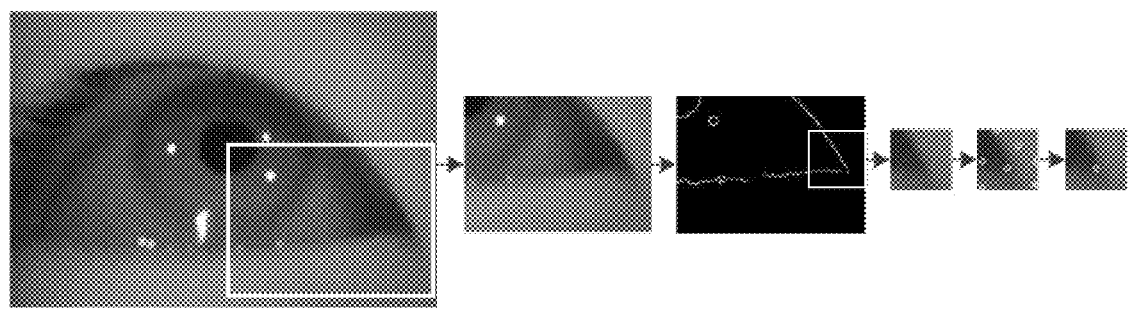
FIG. 5 is a schematic diagram of the method for obtaining an eye-corner position coordinate according to the embodiment of the disclosure.

In the embodiment of the disclosure, an edge detection alogorithm will not be limited to any specific alogorithm, and can be the Canny edge detection alogorithm in a real application. The third picture from the left of FIG. 5 illustrates the edge image as a result of edge detection, where the edge image is traversed, and the coordinate of the rightmost pixel (the pixel farthest from the pupil center coordinate) at the grayscale value of 255 is determined as the coarse coordinate of the eye-corner point.

The step 404 is to cut out, in the first area image, a second area image including the eye-corner with the coarse coordinate of eye-corner point being a center.

In the embodiment of the disclosure, the size of the second area image will not be limited to any specific size. By way of an example, as illustrated in the third and fourth pictures from the left of FIG. 5, the eye-corner area with the size of L*L is obtained, where $$L = \frac{H}{3},$$

where H is the height of the human eye in the current image, or the length L can be determined in the real image.

The step 405 is to perform corner detection on the second area image to obtain the plurality of corner point coordinates.

In the embodiment of the disclosure, a corner detection alogorithm will not be limited to any specific alogorithm, and can be the Shi-Tomas corner detection alogorithm in a real application. The fifth picture from the left of FIG. 5 illustrates the plurality of corner point coordinates obtained as a result of corner detection which satisfy condition.

The step 406 is to determine the corner point coordinate closest to the coarse coordinate of the eye-corner point among the plurality of corner point coordinates as the eye-corner position coordinate in the real-time eye image.

The distance between each corner point coordinate and the coarse coordinate of the eye-corner point is determined, to select the corner point coordinate closest to the coarse coordinate of the eye-corner point as the eye-corner position coordinate ($x_{corner}$, $y_{corner}$) in the real-time eye image, as illustrated in the rightmost picture in FIG. 5.

It shall be noted that the pupil center coordinate and the eye-corner position coordinate in a calibration eye image can be obtained in the same way as the pupil center coordinate and the eye-corner position coordinate in the real-time eye image, so a repeated description thereof will be omitted here.

Figure 6:
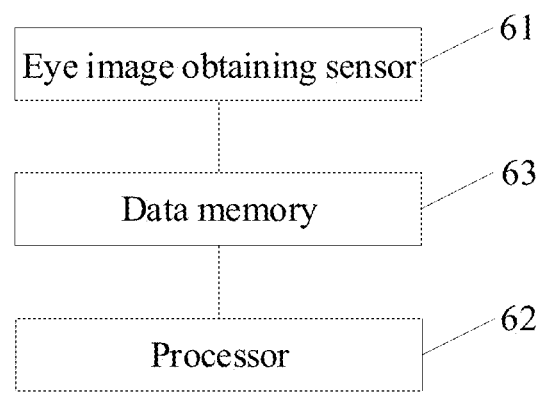
FIG. 6 is a block diagram of a gaze point compensation apparatus in a display device according to an embodiment of the disclosure.

Another embodiment of the disclosure provides a gaze point compensation apparatus in a display device. As illustrated in FIG. 6, the apparatus includes the followings.

An eye image obtaining sensor 61 is configured to obtain a real-time eye image of a user.

A processor 62 is configured to obtain eye-corner position coordinate in the real-time eye image; when the eye-corner position coordinate is within an initial calibration range, to make first compensation for the eye-corner position coordinate according to a correspondence relationship between a pupil and an eye-corner position, when the eye-corner position coordinate is outside the initial calibration range, to make second compensation for the eye-corner position coordinate, where the second compensation is configured to make the eye-corner position coordinate after the second compensation at least be within the initial calibration range; and to compensate for a gaze point according to the first compensation or the second compensation.

A data memory 63 is configured to store the real-time eye image, the eye-corner position coordinate in the real-time eye image, and the correspondence relationship between the pupil and the eye-corner position.

In a real application, the data memory 63 is further configured to store a plurality of calibration eye images, and a correspondence relationship between the eye-corner position and a gaze point position.

Furthermore the second compensation includes first sub-compensation and second sub-compensation.

The processor 62 is configured: to make the first sub-compensation for the eye-corner position coordinate, where the first sub-compensation is configured to make the eye-corner position coordinate after the first sub-compensation be within the initial calibration range; and to make the second sub-compensation for the eye-corner position coordinate after the first sub-compensation, where the second sub-compensation is to compensate for the eye-corner position coordinate according to the correspondence relationship between the pupil and the eye-corner position.

The respective components in the gaze point compensation apparatus above have been described in connection with the respective steps in the method in a display device, so a repeated description thereof will be omitted here.

Still another embodiment of the disclosure provides a display device. The display device includes: a memory configured to store computer program; and a processor configured to execute the computer program to perform the gaze point compensation method in a display device according to any one of the embodiments above of the disclosure.

In the embodiments of the disclosure, it is determined whether the eye-corner position coordinate in the real-time eye image is within the initial calibration range, then the first compensation or the second compensation is made for the eye-corner position coordinate according to the correspondence relationship between a pupil and an eye-corner position, and finally the gaze point corresponding to the real-time eye image is further compensated according to the first compensation or the second compensation, so that when the human eye slides relative to the display device, a sliding compensation of gaze point of the human eye can be made to thereby improve the precision of eye tracking in the display device.

The foregoing disclosure is only illustrative of the specific embodiments of the disclosure, but the claimed scope of the disclosure will not be limited thereto, and any variations or alternatives thereto which can readily occur to those skilled in the art without departing from the spirit of the disclosure shall fall into the claimed scope of the disclosure. Accordingly the claimed scope of the disclosure shall be as defined in the appended claims of the disclosure.

The invention claimed is:

1. A gaze point compensation method in a display device, comprising:
obtaining a real-time eye image of a user;
obtaining an eye-corner position coordinate in the real-time eye image;
making first compensation for the eye-corner position coordinate according to a correspondence relationship between a pupil and an eye-corner position when the eye-corner position coordinate is within an initial calibration range; making second compensation for the eye-corner position coordinate when the eye-corner position coordinate is outside the initial calibration range, wherein the second compensation is configured to make the eye-corner position coordinate after the second compensation at least be within the initial calibration range; and
compensating for a gaze point according to the first compensation or the second compensation;
wherein the second compensation comprises first sub-compensation and second sub-compensation; and
making the second compensation for the eye-corner position coordinate comprises:
making the first sub-compensation for the eye-corner position coordinate, wherein the first sub-compensation is configured to make the eye-corner position coordinate after the first sub-compensation be within the initial calibration range; and
making the second sub-compensation for the eye-corner position coordinate after the first sub-compensation, wherein the second sub-compensation is to compensate for the eye-corner position coordinate according to the correspondence relationship between the pupil and the eye-corner position;
wherein making the first sub-compensation for the eye-corner position coordinate comprises:
determining a minimum compensation amount for making the eye-corner position coordinate be within the initial calibration range as a coarse compensation amount; and
determining a sum of the coarse compensation amount and the eye-corner position coordinate as the eye-corner position coordinate after the first sub-compensation;
wherein making the second sub-compensation for the eye-corner position coordinate after the first sub-compensation comprises:
determining a sum of pupil center coordinate in the real-time eye image and the coarse compensation amount as the pupil center coordinate after compensation; and
obtaining the eye-corner point coordinate corresponding to the pupil center coordinate after compensation according to the correspondence relationship between the pupil and the eye-corner position, and determining a difference between the eye-corner point coordinate and the eye-corner position coordinate after the first sub-compensation as a precise compensation amount; and
wherein compensating for the gaze point according to the second compensation comprises:
determining a sum of the coarse compensation amount and the precise compensation amount as an eye-corner point compensation amount, and
compensating for the gaze point according to the eye-corner point compensation amount.

2. The method according to claim 1, wherein making the first compensation on the eye-corner position coordinate comprises:
obtaining an eye-corner point coordinate corresponding to a pupil center coordinate in the real-time eye image according to the correspondence relationship between the pupil and the eye-corner position; and
determining a difference between the eye-corner point coordinate and the eye-corner position coordinate as an eye-corner point compensation amount; and
wherein compensating for the gaze point according to the first compensation comprises:
compensating for the gaze point according to the eye-corner point compensation amount.

3. The method according to claim 1, further comprising:
creating the correspondence relationship between the pupil and the eye-corner position.

4. The method according to claim 3, wherein creating the correspondence relationship between the pupil and the eye-corner position comprises:
obtaining a plurality of calibration eye images when the user is gazing at a plurality of calibration points respectively;
obtaining pupil center coordinates and eye-corner position coordinates in the calibration eye images; and
creating a relationship equation between the pupil and the eye-corner position according to the pupil center coordinates and the eye-corner position coordinates in the calibration eye images.

5. The method according to claim 4, wherein the relationship equation between the pupil and the eye-corner position is as follows:

$$x_{corner} = a_0 + a_1 \cdot x + a_2 \cdot x^2 + a_3 \cdot x^3$$

$$y_{corner} = b_0 + b_1 \cdot y + b_2 \cdot y^2 + b_3 \cdot y^3$$

wherein the pupil center coordinate is (x, y), the eye-corner position coordinate is ($x_{corner}$, $y_{corner}$), and $a_0$, $a_1$, $a_2$, and $a_3$, and $b_0$, $b_1$, $b_2$, and $b_3$ are coefficients of a fitting curve for the pupil and the eye-corner position.

6. The method according to claim 1, wherein obtaining the eye-corner position coordinate in the real-time eye image comprises:
obtaining a pupil center coordinate in the real-time eye image;
performing edge detection on the real-time eye image, to determine a coordinate of an edge point in an eye-corner area farthest from the pupil center coordinate as a coarse coordinate of an eye-corner point in the real-time eye image; and
performing corner detection on the real-time eye image to obtain a plurality of corner point coordinates, and determining the corner point coordinate closest to the coarse coordinate of the eye-corner point among the plurality of the corner point coordinates as the eye-corner position coordinate in the real-time eye image.

7. The method according to claim 6, wherein obtaining the pupil center coordinate in the real-time eye image comprises:
- binarizing the real-time eye image, extracting a largest connected area satisfying a pupil characteristic in the binarized real-time eye image, and extracting edge points of the largest connected area; and
- obtaining the pupil center coordinate through pupil elliptical fitting of the edge points.

8. The method according to claim 2, wherein compensating for the gaze point according to the eye-corner point compensation amount comprises:
- obtaining a gaze point coordinate corresponding to the eye-corner point coordinate, and a gaze point compensation amount corresponding to the eye-corner point compensation amount according to a relationship equation between an eye-corner position and a gaze point position; and
- determining a sum of the gaze point coordinate and the gaze point compensation amount as the gaze point coordinate after compensation.

9. The method according to claim 8, wherein creating the correspondence relationship between the eye-corner position and the gaze point position comprises:
- obtaining a plurality of calibration eye images when the user is gazing at a plurality of calibration points respectively;
- obtaining eye-corner position coordinates in the calibration eye images, and obtaining gaze point position coordinates corresponding to the plurality of calibration eye images; and
- creating a relationship equation between the eye-corner position and the gaze point position according to the eye-corner position coordinates in the calibration eye images and the gaze point position coordinates.

10. The method according to claim 9, wherein the relationship equation between the eye-corner position and the gaze point position is as follows:

$$G_x = c_0 + c_1 \cdot x_{corner} + c_2 \cdot y_{corner} + c_3 \cdot x_{corner} \cdot y_{corner}$$

$$G_y = d_0 + d_1 \cdot x_{corner} + d_2 \cdot y_{corner} + d_3 \cdot x_{corner} \cdot y_{corner}$$

wherein the gaze point position coordinate is $(G_x, G_y)$, the eye-corner position coordinate is $(x_{corner}, y_{corner})$, and $c_0$, $c_1$, $c_2$, and $c_3$, and $d_0$, $d_1$, $d_2$, and $d_3$ are coefficients of a fitting curve for the eye-corner position and the gaze point position.

11. The method according to claim 1, wherein compensating for the gaze point according to the eye-corner point compensation amount comprises:
- obtaining a gaze point coordinate corresponding to the eye-corner point coordinate, and a gaze point compensation amount corresponding to the eye-corner point compensation amount according to a relationship equation between an eye-corner position and a gaze point position; and
- determining a sum of the gaze point coordinate and the gaze point compensation amount as the gaze point coordinate after compensation.

12. The method according to claim 11, wherein creating the correspondence relationship between the eye-corner position and the gaze point position comprises:
- obtaining a plurality of calibration eye images when the user is gazing at a plurality of calibration points respectively;
- obtaining eye-corner position coordinates in the calibration eye images, and obtaining gaze point position coordinates corresponding to the plurality of calibration eye images; and
- creating a relationship equation between the eye-corner position and the gaze point position according to the eye-corner position coordinates in the calibration eye images and the gaze point position coordinates.

13. The method according to claim 12, wherein the relationship equation between the eye-corner position and the gaze point position is as follows:

$$G_x = c_0 + c_1 \cdot x_{corner} + c_2 \cdot y_{corner} + c_3 \cdot x_{corner} \cdot y_{corner}$$

$$G_y = d_0 + d_1 \cdot x_{corner} + d_2 \cdot y_{corner} + d_3 \cdot x_{corner} \cdot y_{corner}$$

wherein the gaze point position coordinate is $(G_x, G_y)$, the eye-corner position coordinate is $(x_{corner}, y_{corner})$, and $c_0$, $c_1$, $c_2$, and $c_3$, and $d_0$, $d_1$, $d_2$, and $d_3$ are coefficients of a fitting curve for the eye-corner position and the gaze point position.

14. A gaze point compensation apparatus in a display device, the apparatus comprising:
- an eye image obtaining sensor configured to obtain a real-time eye image of a user;
- a processor configured to obtain an eye-corner position coordinate in the real-time eye image; when the eye-corner position coordinate is within an initial calibration range, to make first compensation for the eye-corner position coordinate according to a correspondence relationship between a pupil and an eye-corner position; when the eye-corner position coordinate is outside the initial calibration range, to make second compensation for the eye-corner position coordinate, wherein the second compensation is configured to make the eye-corner position coordinate after the second compensation at least be within the initial calibration range; and to compensate for a gaze point according to the first compensation or the second compensation; and
- a data memory configured to store the real-time eye image, the eye-corner position coordinate in the real-time eye image, and the correspondence relationship between the pupil and the eye-corner position;
- wherein the second compensation comprises first sub-compensation and second sub-compensation; and
- the processor is configured: to make the first sub-compensation for the eye-corner position coordinate, wherein the first sub-compensation is configured to make the eye-corner position coordinate after the first sub-compensation be within the initial calibration range; and to make the second sub-compensation for the eye-corner position coordinate after the first sub-compensation, wherein the second sub-compensation is to compensate for the eye-corner position coordinate according to the correspondence relationship between the pupil and the eye-corner position;
- wherein making the first sub-compensation for the eye-corner position coordinate comprises: determining a minimum compensation amount for making the eye-corner position coordinate be within the initial calibration range as a coarse compensation amount; and determining a sum of the coarse compensation amount and the eye-corner position coordinate as the eye-corner position coordinate after the first sub-compensation;

wherein making the second sub-compensation for the eye-corner position coordinate after the first sub-compensation comprises:

determining a sum of pupil center coordinate in the real-time eye image and the coarse compensation amount as the pupil center coordinate after compensation; and obtaining the eye-corner point coordinate corresponding to the pupil center coordinate after compensation according to the correspondence relationship between the pupil and the eye-corner position, and determining a difference between the eye-corner point coordinate and the eye-corner position coordinate after the first sub-compensation as a precise compensation amount; and wherein compensating for the gaze point according to the second compensation comprises:

determining a sum of the coarse compensation amount and the precise compensation amount as an eye-corner point compensation amount, and compensating for the gaze point according to the eye-corner point compensation amount.

15. A display device, comprising:

a memory configured to store computer program; and a processor configured to execute the computer program to perform the gaze point compensation method according to claim 1.

* * * * *